United States Patent [19]

Uhland et al.

[11] Patent Number: 4,550,002
[45] Date of Patent: Oct. 29, 1985

[54] METHOD AND APPARATUS FOR ACHIEVING OPTIMUM DISCHARGE FROM A TWIN-SCREW EXTRUSION DEVICE

[75] Inventors: Eberhard Uhland; Manfred Dienst, both of Burgdorf; Claus-Heinrich Wente, Hanover, all of Fed. Rep. of Germany

[73] Assignee: Hermann Berstorff Maschinenbau GmbH, Hanover, Fed. Rep. of Germany

[21] Appl. No.: 590,574

[22] Filed: Mar. 16, 1984

[30] Foreign Application Priority Data

Mar. 23, 1983 [DE] Fed. Rep. of Germany ....... 3310484

[51] Int. Cl.⁴ .............................................. B29F 3/08
[52] U.S. Cl. .................................. 264/40.1; 264/40.6; 264/40.7; 425/144; 425/145; 425/162; 425/204
[58] Field of Search ............... 264/40.1, 40.7, 40.6; 425/144, 145, 143, 162, 204, 140–141

[56] References Cited

U.S. PATENT DOCUMENTS

| | | | |
|---|---|---|---|
| 3,204,291 | 9/1965 | McWhorter et al. | 425/145 |
| 3,354,501 | 11/1967 | Bachman et al. | 425/145 |
| 3,674,397 | 7/1972 | Harris | 425/145 |
| 3,728,056 | 4/1973 | Theysohn | 425/145 |
| 3,799,719 | 3/1974 | Bonikowski et al. | 264/40.7 |
| 4,110,394 | 8/1978 | Shimada et al. | 264/40.7 |
| 4,309,114 | 1/1982 | Klein et al. | 264/40.7 |

FOREIGN PATENT DOCUMENTS

| | | | |
|---|---|---|---|
| 2251769 | 5/1974 | Fed. Rep. of Germany | 425/145 |
| 701829 | 12/1979 | U.S.S.R. | 425/144 |
| 797897 | 1/1981 | U.S.S.R. | 425/145 |
| 801111 | 1/1981 | U.S.S.R. | 425/145 |

Primary Examiner—Jeffery Thurlow
Attorney, Agent, or Firm—Schwartz, Jeffery, Schwaab, Mack, Blumenthal & Evans

[57] ABSTRACT

A method and apparatus for regulating a dose-charged twin-screw extrusion device so as to achieve optimum quantitative discharge of a material being extruded in an automatic manner. By monitoring the screw torque and the mass temperature and modifying the dosed supply of material and/or the screw speed in accordance with the monitored values, the optimum mode of operation is ensured for the extrusion device which fully utilizes the discharge capacity of the device without risking damage either to the extrusion device itself or to the material being extruded.

10 Claims, 2 Drawing Figures trusion device is driven by a drive motor 5 through a transmission system 4.

The extrusion device further includes a barrel 6 in which there are located two screw conveyors (not shown) utilised for homogenizing a plastics material to be plasticised. Such plastics material is introduced into a material feed hopper 7 of the device in the form of a granulate. The conveyor screws extrude the plastics material in the form of, for example, a profile, by the use of a nozzle 8.

The feed means 2, which may be in the form of a conveyor belt, is disposed above the material feed hopper 7, and is actuated by drive means (not shown). The drive for the conveyor belt of the feed means 2 utilised for providing a dosed supply of material is connected to the regulator 3 and can therefore be accelerated or retarded thereby. The transmission system 4 includes a drive shaft 9, and the torque for the screw drive is monitored at such shaft 9. Means 10 for effecting such monitoring are also connected to the regulator 3. The screw speed can thus also be modified by the regulator 3. Accordingly, the regulator 3 is also connected to the drive 5.

A temperature sensing and scanning device 11 is also connected to the regulator 3. The device 11 is provided in the vicinity of the outlet of the extrusion device.

The method of the present invention will now be described. For the sake of clarity, it will be assumed that, at the outset, the temperature sensing and scanning device 11 indicates that the temperature of the material is too low and the torque monitoring means 10 indicate too low a torque for optimum operation of the extrusion device.

In such circumstances, the regulator 3 acts upon the material feed means in such a manner that the amount of material introduced into the hopper 7 of the extrusion device is increased.

As dosed supply of material is intensified, the torque increases until the safety limit value thereof is reduced. This is recorded by the regulator 3. The intensified dosing supply of the material also causes the mass temperature in the extrusion device to drop. This drop is recorded by the temperature scanning device 11 and is transmitted to the regulator 3.

When the maximum permissible torque value is reached, the regulator 3 accelerates the screw speed by actuating the drive 5. This causes the mass temperature to rise until the safety limit of such temperature. The temperature is monitored by the temperature scanning or monitoring device 11 and the information is transmitted to the regulator 3. It should, perhaps, be pointed out that the torque drops if the screw speed is increased whilst the dosed supply of material is kept constant.

The regulator 3 thereafter causes the means 2 for supplying the material to increase the dosage further. The mass temperature, in turn, drops if the drive speed is maintained constant, with a simultaneous increase in the torque.

The optimum operating conditions are therefore gradually reached by further, alternate, increases in the screw speed and in the dosed supply of material.

The method is therefore carried out by alternately increasing the processing temperature of the material and the torque to their maximum permitted limits. By so doing, the maximum obtainable discharge is continuously achieved without risking decomposition of the material or damage to the extrusion device.

The above-described process will be explained in greater detail with reference to the graph shown in FIG. 2. In this figure the discharge, in kg/h, from the extrusion device is plotted along the X-axis, whilst the mass temperature, in °C., is plotted along the Y-axis.

The Z-curves shown in FIG. 2 indicate lines of identical speeds and the torque curves are referenced T.

At an assumed screw speed of, for example, 150 r.p.m., a discharge of 400 kg/h and a temperature of 220° C. result (Point 1). If the dosed supply of material is now increased at a constant drive speed, the discharge rises to 5000 kg/h, the temperature drops to 200° C. and the torque simultaneously increases to the maximum value minus a safety margin (hatched line $T_s = 3,960$ Nm) (Point 2). If the drive speed is now increased with a constant dosed supply, the mass temperature rises again. Such drive speed is increased with a constant dosed supply of material until the mass temperature reaches the pre-determined safety margin (250° C. minus 2° C. safety margin equals 248° C.) shown by the hatched line $\theta_s = 248°$ C. (Point 3). The screw speed at this point is 200 r.p.m.

When the safety level is reached (Point 3), the regulator 3 effects a renewed dosed supply of material at the same speed, whereby the temperature drops from 248° C. to 218° C. (Point 4); the discharge simultaneously rises to 660 kg/h, and the torque simultaneously rises to the maximum value $T_{max.}$ less the safety margin.

However, since the temperature has dropped, the screw speed can be increased to 240 r.p.m. In turn, this causes the mass temperature to increase to 248° C. and the torque to decrease (Point 5).

The regulator again effects, therefore, an intensified dosed supply of material; the mass temperature drops to 230° C., and the discharge increases to 750 kg/h (Point 6).

These alternate steps are continued until both the maximum permitted temperature, minus the safety margin, and the maximum permitted torque, minus the safety margin, are reached, at which time the extrusion device is operating under optimum conditions.

In this case, a temperature of 250° C. was set as the upper limit less 2° C. safety margin, i.e. 248° C., and a maximum torque of 4,000 Nm, less a safety margin of 80 Nm, i.e. 3,920 Nm. Point 7 therefore represents the optimum working conditions which can be used constantly and without any risk either to the material or to the extrusion device.

If the optimum working conditions in respect of the maximum discharge and the maximum permitted temperature are attained, (Point 7), the regulator 3 operates to maintain such conditions. Thus, for example, if the safety temperature is exceeded, the dosed supply and the screw speed are reduced and/or the screw speed is increased so as to cause the temperature to drop back to its safety limit.

The method according to the present invention therefore permits the extrusion device to operate in an optimum manner, both in terms of the discharge produced and the operational temperature, without the need for manual intervention and without the risk of the machine being damaged because of the torque being too high. It is, of course, a well-known problem in twin-screw extruders that over-dosing the material may lead to the screw channels being completely filled with material. This causes an excessive pressure build-up in the barrel, far beyond permitted limits, and quickly leads to destruction of the extrusion device. It is, therefore, essen-

METHOD AND APPARATUS FOR ACHIEVING OPTIMUM DISCHARGE FROM A TWIN-SCREW EXTRUSION DEVICE

FIELD OF THE INVENTION

The present invention relates to a method and apparatus for improving the output from a twin-screw extrusion device.

DISCUSSION OF PRIOR ART

German Offenlegungsschrift No. 2 335 612 discloses a method and apparatus for stabilising the mass throughput of an extrusion device. By utilising manometers, the back pressure in a back pressure bearing forming part of the extrusion device is measured. A signal is thus obtained which actuates the drive for the material supply device.

A scanning process which utilises a back pressure as a control parameter must be somewhat inefficient because completely different circumstances arise with each change of material, for example, changes in the melting index or the viscosity of the material. Such a known arrangement does not include means for achieving the optimum operation of an extrusion device with regard to its discharge, even though this is extremely important, particularly from an economic point of view.

For safety reasons, extrusion devices are usually only utilised up to a maximum of 80% of their theoretical material processing capacity. This prevents damage to the transmission, the screw shaft and the individual screw component parts. In consequence, such an arrangement does not utilise the operational capacity of the device in a particularly economical manner.

OBJECTS OF THE INVENTION

The present invention seeks to provide a method by means of which the discharge from dose-charged twin-screw extrusion devices can be increased to, substantially, the maximum operational limit without causing damage to the extrusion device and, more particularly, to the material being processed. The invention further seeks to provide an apparatus which can be used for carrying out such a method. In a desirable aspect, the method and apparatus of the present invention should also be capable of being applied to known devices so as to permit the optimum discharge to be obtained therefrom.

SUMMARY OF THE INVENTION

According to the present invention, there is provided a method of operating a dose-charged twin-screw extrusion device to achieve optimum quantitative discharge of a material being extruded, wherein the torque of the screws is monitored and compared with a pre-selected desired maximum torque value, such pre-selected value being less than the maximum operational torque value by a safety margin and wherein the temperature of the material is also monitored and compared with a pre-selected desired maximum value, such pre-selected temperature value being less than the decomposition or otherwise determined maximum operational processing temperature of said material by a safety margin, the dosed supply of the material and/or the rotational speed of the screws being suitably adjusted if the monitored torque and/or temperature differ from the pre-selected desired maximum values therefor to cause both such maximum desired values to be attained simultaneously.

Preferably, the safety margin corresponds to between 1 and 15% of the maximum operational torque value of the screws.

Advantageously, the temperature safety margin is between 1° and 20° C. below the decomposition or otherwise determined maximum processing temperature of the material.

In a preferred embodiment, the method comprises the alternate steps of increasing the torque to its maximum desired value by increasing the dosed supply of material thereby causing the temperature of the material to fall and increasing the temperature of the material by increasing the screw speeds at a constant dosed supply thereby causing the torque value to drop until both the desired maximum torque and temperature values are attained simultaneously.

Also in accordance with the present invention, there is provided an apparatus for operating a dose-charged twin-screw extrusion device to achieve optimum quantitative discharge of a material being extruded, the device having a drive for the dosing means and a drive for driving the screws, comprising monitoring means for monitoring the screw torque and further means for monitoring the temperature of the material being extruded, both said monitoring means being connected to a regulator and said regulator being connected to both said drive means whereby said drive means are each controlled by said regulator in dependence upon signals received by said regulator from said torque and said temperature monitoring means.

Preferably, the torque is monitored by an electrical current metering device which measures the current consumption of the drive means for the screws.

By monitoring the torque and temperature and by suitably modifying the dosed supply of material and/or the screw speed, it is possible to utilise the extrusion device safely at substantially its full potential without risking fracture of the screws, transmission damage or damage to the material being extruded.

Since the torque and temperature are monitored and automatically regulated, a small safety margin is maintained with respect to the maximum permitted torque and temperature. By so doing, optimum discharge can be achieved.

In this manner, the extrusion device is automatically regulated and caused to operate at its maximum desired torque and temperature.

BRIEF DESCRIPTION OF THE DRAWINGS

One embodiment of the present invention will be further described, by way of example, with reference to the accompanying drawings, in which.

DESCRIPTION OF PREFERRED EMBODIMENT

Figure 1:
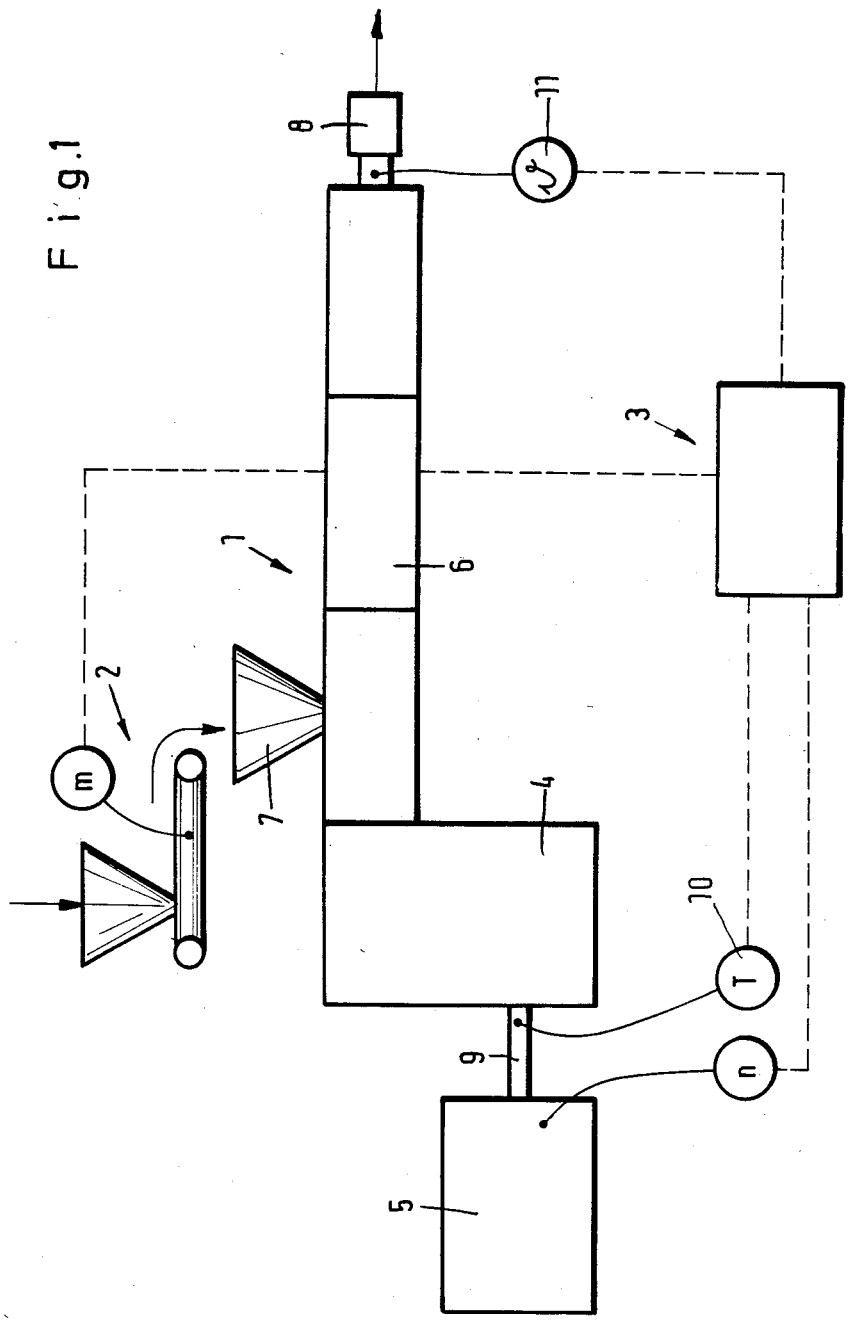
FIG. 1 is a schematic block circuit diagram of an extrusion system.
Figure 2:
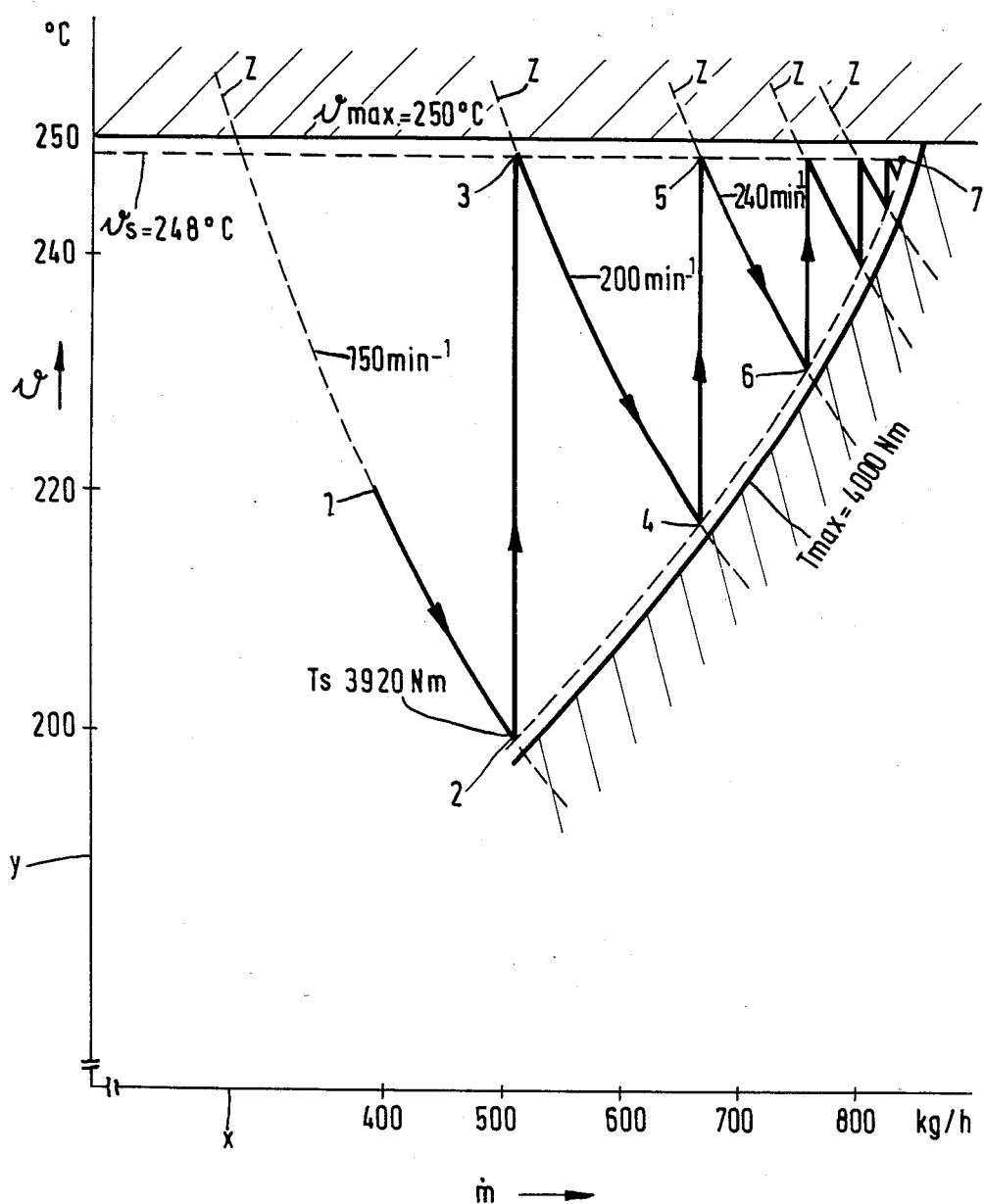
FIG. 2 is a graph of mass temperature (°C.) against discharge rate (kg/h) and which also shows the behaviour of the dosed supply of material, the torque and the screw speed of the system shown in FIG. 1.

In FIG. 1, an extrusion device is shown which is generally referenced 1. The device 1 has associated therewith means 2 for providing a dosed supply of material to the drive. Also provided is a regulator 3 which will be described in greater detail hereinafter. The extial that such over-dosing is not permitted to occur and this is achieved, in the method of the present invention, by monitoring and suitably modifying the torque and/or the temperature of the material in the extrusion device.

We claim:

1. A method of operating a dose-charged extrusion device having twin screws to achieve optimum quantitative discharge of a material being extruded, comprising the steps of:
   (a) feeding material to said extrusion device in variably controlled quantity dosages;
   (b) monitoring the torque of the screws and comparing the monitored torque value with a pre-selected maximum torque value, such pre-selected value being less than the maximum operational torque value by a safety margin;
   (c) monitoring the temperature of the material being extruded and comparing the monitored temperature value with a pre-selected maximum value, such pre-selected temperature value being less than the decomposition or otherwise determined maximum operational processing temperature of said material by a safety margin;
   (d) modifying the dosage quantity of material and the speed of the screws when said monitored torque and temperature values differ from said pre-selected maximum torque and temperature values therefor until the desired maximum value of torque and temperature are reached, at which time optimum operating conditions regarding the quantity and temperature of the material are achieved, and
   (e) discharging the extruded material.

2. A method as recited in claim 1, in which reduction of the dosed supply of material and an increase in the screw speeds each cause a reduction in the torque, and in which an increase in the dosed supply of material and a decrease in screw speeds each cause an increase in the torque.

3. A method as recited in claim 1, in which said torque safety margin corresponds to between 1 and 15% of said maximum operational torque value of the screws.

4. A method as recited in claim 1 wherein the temperature of the material is monitored adjacent the discharge end of the extrusion device.

5. A method as recited in claim 1 wherein an increase in said screw speed and a decrease in said dosed supply of material each cause said temperature to rise, and a reduction in said screw speed and an increase in said dosed supply of material each cause said temperature to fall.

6. A method as recited in claim 1 wherein said temperature safety margin is between 1° and 20° C. below the decomposition or otherwise determined maximum processing temperature of the material.

7. A method as recited in claim 1 further comprising the alternate steps of increasing said torque to its maximum desired value by increasing said dosed supply of material thereby causing said temperature of the material to fall, and increasing said screw speed at a constant dosed supply thereby causing the temperature of the material to increase and said torque value to drop, said alternate steps continuing until the desired maximum values of both said torque and said temperature are attained simultaneously.

8. An apparatus for operating a dose-charged twin-screw extrusion device to achieve optimum quantitative discharge of a material being extruded, said extrusion device comprising
   (a) drive means for said twin screws,
   (b) means for dose-charging material to said extrusion device, and means for driving said dose-charging means,
   (c) regulator means operatively connected to said drive means for said twin screws and said drive means for said dose-charging means,
   (d) torque monitoring means operatively connected to said regulator means for monitoring the torque produced by said twin screws and producing a signal indicative of said torque, and
   (e) temperature monitoring means operatively connected to said regulator means for monitoring the temperature of said material being extruded and producing a signal indicative of the temperature of said material,
   said regulator means controlling both of said drive means for controlling the speed of rotation of said twin screws and the feed of material to said extrusion device by said dose-feeding means in response to said signals whereby optimum conditions of temperature and quantity of extruded material can be achieved.

9. An apparatus as recited in claim 8 wherein said extrusion device further includes a discharge end region from which said material is extruded, said temperature monitoring means being disposed in said discharge end region of said extrusion device.

10. An apparatus as recited in claim 8 wherein said drive means for said twin screws is an electrical drive, and wherein said torque monitoring means comprises an electrical current metering device measuring the current consumption of said electrical drive means.

* * * * *